(12) United States Patent
Quan (10) Patent No.: US 7,439,862 B2
(45) Date of Patent: Oct. 21, 2008

(54) ANTENNA ARRAY FOR AN RFID READER COMPATIBLE WITH TRANSPONDERS OPERATING AT DIFFERENT CARRIER FREQUENCIES

(75) Inventor: Ralph W. Quan, Broomfield, CO (US)

(73) Assignee: Assa Abloy AB (SE)

( * ) Notice: Subject to any disclaimer, the term of this patent is extended or adjusted under 35 U.S.C. 154(b) by 296 days.

(21) Appl. No.: 11/016,576

(22) Filed: Dec. 16, 2004

(65) Prior Publication Data

US 2005/0258966 A1    Nov. 24, 2005

Related U.S. Application Data

(63) Continuation-in-part of application No. 10/848,246, filed on May 18, 2004.

(51) Int. Cl.
  *G08B 13/14*    (2006.01)
(52) U.S. Cl. .............. 340/572.7; 340/10.3; 340/572.1; 340/572.4; 340/572.5; 340/572.6; 342/129
(58) Field of Classification Search .......... 340/572.7, 340/572.1, 572.2, 10.1, 10.33, 572.3, 10.3, 340/572.4, 572.5, 572.6; 342/129
See application file for complete search history.

(56) References Cited

U.S. PATENT DOCUMENTS

| | | | |
|---|---|---|---|
| 4,730,188 A | 3/1988 | Milheiser | |
| 5,347,263 A | 9/1994 | Carroll et al. | |
| 5,519,381 A | 5/1996 | Marsh et al. | |
| 5,541,574 A | 7/1996 | Lowe et al. | |
| 6,476,708 B1 | 11/2002 | Johnson | |
| 6,700,547 B2 | 3/2004 | Mejia et al. | |
| 6,750,771 B1 * | 6/2004 | Brand | 340/572.7 |
| 6,946,950 B1 * | 9/2005 | Ueno et al. | 340/10.1 |
| 7,071,791 B1 * | 7/2006 | Wilson, III | 333/17.1 |
| 7,119,664 B2 * | 10/2006 | Roesner | 340/10.33 |
| 7,119,738 B2 * | 10/2006 | Bridgelall et al. | 342/129 |
| 7,158,030 B2 * | 1/2007 | Chung | 340/572.1 |
| 7,268,687 B2 * | 9/2007 | Egbert et al. | 340/572.7 |
| 2003/0090367 A1 | 5/2003 | Carroll et al. | |

FOREIGN PATENT DOCUMENTS

| | | |
|---|---|---|
| GB | 2278631 B | 12/1994 |
| JP | H07-230560 | 8/1995 |
| JP | 2002-076983 | 3/2002 |

(Continued)

OTHER PUBLICATIONS

Patent Abstracts of Japan, Title: "Radio Tag Reader-Writer", Inventor: Tomomi, Publication No. 2004187159, Publication Date: Jul. 2, 2004.

(Continued)

*Primary Examiner*—Davetta W. Goins
(74) *Attorney, Agent, or Firm*—Sheridan Ross P.C.

(57) ABSTRACT

An antenna array is provided for an RFID reader, which includes a first reader antenna tuned to operate at a first frequency and a second reader antenna tuned to operate at a second frequency different from the first frequency. The first and second antennas are preferably arranged in an overlapping arrangement or an opposing magnetic flux arrangement to reduce the effect of antenna self resonance.

26 Claims, 3 Drawing Sheets

FOREIGN PATENT DOCUMENTS

| | | |
|---|---|---|
| JP | 2003-099721 | 4/2003 |
| JP | 2004-078834 | 3/2004 |
| JP | 2004-086381 | 3/2004 |
| JP | 2005-284455 | 10/2005 |
| WO | WO-03/061060 A2 | 7/2003 |

OTHER PUBLICATIONS

Finkenzeller, Klaus, "RFID-Handbuch", Sep. 26, 2002, Chapter 3, pp. 29-61.

Canadian Intellectual Property Office, Communication from the Canadian Patent Office regarding Canadian Patent Application No. 2,507,277, Nov. 23, 2007, pp. 1-2.

European Patent Office, Communication regarding European Patent Application No. 05 253 002.9-2210, ,Jun. 29, 2006, pp. 1-4.

First Official Notice of Rejection (including translation) for Japanese Patent Application No. 2005-143698, mailed Jun. 24, 2008.

* cited by examiner

ANTENNA ARRAY FOR AN RFID READER COMPATIBLE WITH TRANSPONDERS OPERATING AT DIFFERENT CARRIER FREQUENCIES

This a continuation-in-part application of Ser. No. 10/848,246 filed on May 18, 2004, which is incorporated herein by reference.

TECHNICAL FIELD

The present invention relates generally to RFID systems, and more particularly to an RFID reader for an RFID system, which has an array of non-interfering antennas tuned to different frequencies for communicating with a plurality of RFID transponders operating at different carrier frequencies.

BACKGROUND OF THE INVENTION

Radio frequency identification (RFID) systems generally consist of one or more RFID readers and a plurality of RFID transponders, which are commonly termed credentials. The RFID transponder is an active or passive radio frequency communication device, which is directly attached to or embedded in an article to be identified or otherwise characterized by the RFID reader, or which is alternatively embedded in a portable substrate, such as a card, keyfob, tag, or the like, carried by a person or an article to be identified or otherwise characterized by the RFID reader. Exemplary RFID systems are disclosed in U.S. Pat. No. 4,730,188 to Milheiser (the '188 Patent), U.S. Pat. No. 5,541,574 to Lowe et al. (the '574 Patent), and U.S. Pat. No. 5,347,263 to Carroll et al. (the '263 Patent), all of which are incorporated herein by reference.

A passive RFID transponder is dependent on the host RFID reader as its power supply. The host RFID reader "excites" or powers up the passive RFID transponder by transmitting high voltage excitation signals into the space surrounding the RFID reader, which are received by the RFID transponder when it is near, but not necessarily in contact with, the RFID reader. The excitation signals from the RFID reader provide the operating power for the circuitry of the recipient RFID transponder. In contrast, an active RFID transponder is not dependent on the RFID reader as its power supply, but is instead powered up by its own internal power source, such as a battery.

Once the passive or active RFID transponder is powered up, the RFID transponder communicates information in a digital format, such as identity data or other characterizing data stored in the memory of the RFID transponder, to the RFID reader and the RFID reader can likewise communicate information back to the RFID transponder without the RFID reader and RFID transponder coming in contact with one another. The powered up RFID transponder communicates with the RFID reader by generating transponder data signals within the circuitry of the RFID transponder and transmitting the transponder data signals in the form of electromagnetic waves into the surrounding space occupied by the RFID reader. The RFID reader contains its own circuitry as well as its own reader programming, which are cooperatively designed to "read" the data contained in the transponder data signals received from the RFID transponder. It is noted that the reader circuitry and programming are typically significantly larger and more complex than the RFID transponder due to the expanded functional requirements of the RFID reader in comparison to the RFID transponder.

An essential feature of all RFID systems is that all RFID transponders and readers of a given system are sufficiently compatible to effectively communicate with one another. Compatibility is achieved in part by specifying the carrier frequency at which data signals are communicated between the RFID transponders and readers of the RFID system. There are currently two standard carrier frequencies which have been generally accepted for use in RFID systems. RFID systems, which employ RFID transponders of the type conventionally termed proximity cards or proximity tags, typically communicate by means of data signals at a carrier frequency within a range of 100 to 150 kHz. This carrier frequency range is nominally referred to herein as 125 kHz carrier frequency and is deemed low frequency. In contrast, RFID systems employing RFID transponders of the type conventionally termed smart cards typically communicate by means of data signals at a carrier frequency of 13.56 MHz, which is deemed high frequency. The frequency bandwidth available for use around the carrier frequency of 13.56 MHz is defined by industry-wide standards such as ISO standards 15693 and 14443.

At present, use of RFID transponders operating at the low carrier frequency and RFID transponders operating at the high carrier frequency have proliferated throughout the world. Therefore, it is both highly desirable and a significant challenge to develop an RFID reader which is compatible with RFID transponders operating at either accepted carrier frequency and which achieves a level of performance comparable with an RFID reader optimized to operate at a single carrier frequency. As such, the present invention recognizes a need for an RFID system having one or more RFID readers, each of which is capable of communicating with a plurality of RFID transponders, one or more of which are operating at a different carrier frequency than the remaining RFID transponders.

It is generally an object of the present invention to provide an RFID system having one or more RFID readers with multiple carrier frequency communication capabilities. It is a more particular object of the present invention to provide such an RFID reader with multiple carrier frequency communication capabilities, wherein the communication range between the RFID reader and the RFID transponders operating at different carrier frequencies is not significantly compromised by the expanded communication capabilities of the RFID reader. It is a further object of the present invention to provide such an RFID reader with multiple carrier frequency communication capabilities, which remains relatively compact despite the expanded communication capabilities of the RFID reader. It is another object of the present invention to provide such an RFID reader with multiple carrier frequency communication capabilities, wherein reader performance is essentially the same whether the RFID reader is communicating with an RFID transponder operating at the low carrier frequency or an RFID transponder operating at the high carrier frequency.

These objects and others are accomplished in accordance with the invention described hereafter.

SUMMARY OF THE INVENTION

The present invention is an antenna array for an RFID reader. The antenna array includes a first reader antenna tuned to operate at a first frequency and a second reader antenna tuned to operate at a second frequency different from the first frequency. A preferred first frequency is nominally 125 kHz and a preferred second frequency is 13.56 MHz. The antenna array preferably further includes a reader housing containing the first and second reader antennas.

In accordance with a preferred embodiment, the first and second antennas are arranged in an overlapping arrangement. In accordance with an alternate preferred embodiment, the first and second antennas are arranged in an opposing magnetic flux arrangement. In accordance with an alternate preferred embodiment encompassing both the overlapping and opposing magnetic flux arrangements simultaneously, the first reader antenna has a first area, the second reader antenna has a second area, and the first and second reader antennas are arranged relative to one another such that only a portion of the first area aligns with only a portion of the second area. In accordance with another alternate preferred embodiment encompassing both the overlapping and opposing magnetic flux arrangements simultaneously, the first and second areas are essentially equal and the first and second reader antennas have a parallel orientation and are arranged relative to one another such that essentially half of the first area aligns with essentially half of the second area.

Another characterization of the present invention is an RFID reader for an RFID system. The RFID reader has an antenna array including a first reader antenna tuned to operate at a first frequency and a second reader antenna tuned to operate at a second frequency different from the first frequency. The RFID reader also has a signal generator coupled with the first and second reader antennas. The signal generator is preferably an integrated signal generator including integral means for generating signals for transmission from the first and second reader antennas. Alternatively, the signal generator preferably includes a discrete first signal generator coupled with the first reader antenna for generating signals for transmission from the first reader antenna and a discrete second signal generator coupled with the second reader antenna separate from the discrete first signal generator for generating signals for transmission from the second reader antenna.

In accordance with an alternate embodiment, the RFID reader has receiver electronics coupled with the first and second reader antennas. The receiver electronics is preferably integrated receiver electronics including integral means for conditioning signals received by the first and second reader antennas. Alternatively, the receiver electronics preferably includes discrete first receiver electronics coupled with the first reader antenna for conditioning signals received by the first reader antenna and discrete second receiver electronics coupled with the second reader antenna separate from the discrete first receiver electronics for conditioning signals received by the second reader antenna.

The present invention will be further understood from the drawings and the following detailed description.

DESCRIPTION OF PREFERRED EMBODIMENTS

Figure 1:
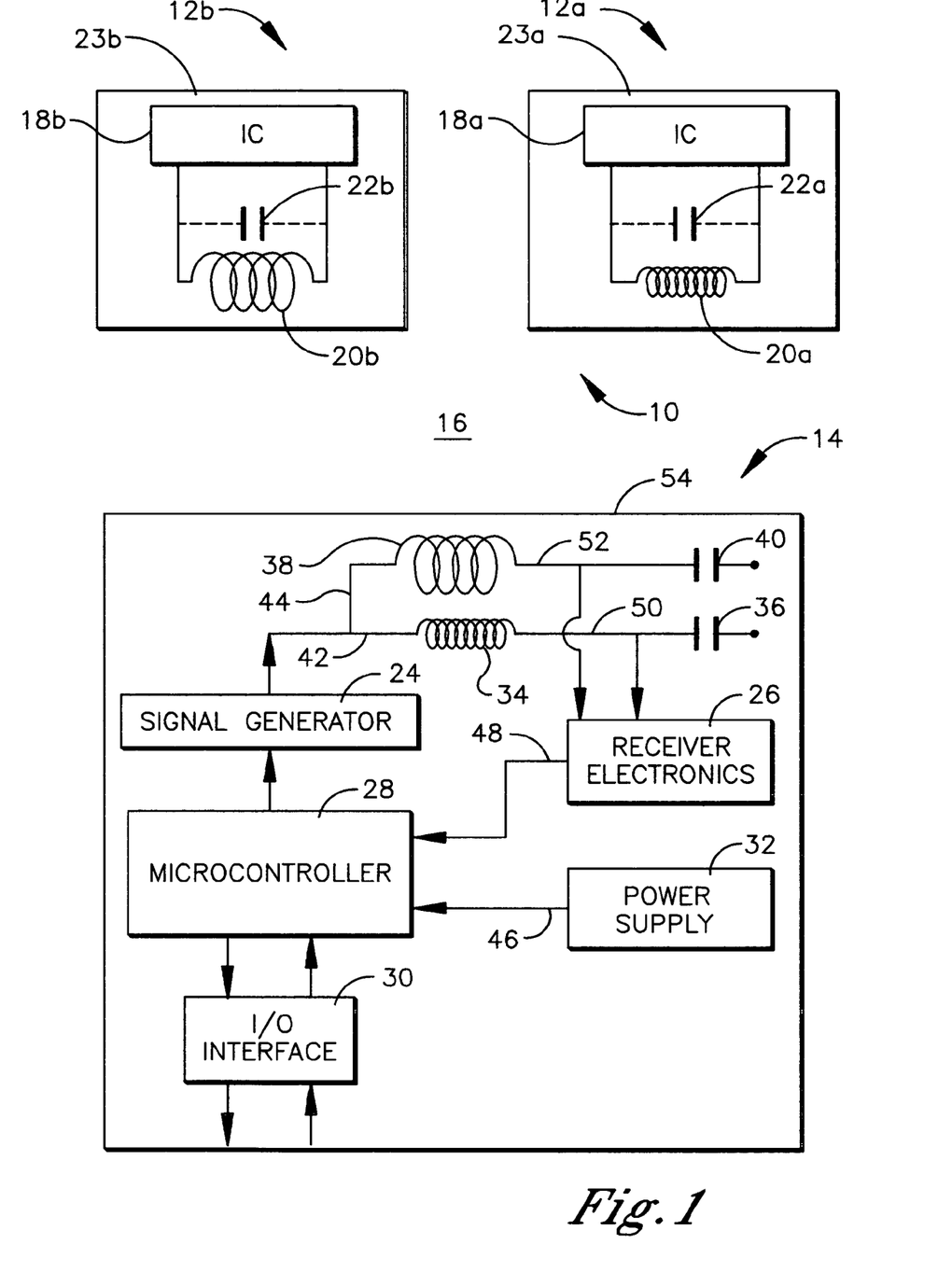
FIG. 1 is a schematic block diagram of an RFID system including a plurality of RFID transponders and an RFID reader of the present invention.

Referring initially to FIG. 1, a conceptualized RFID system is shown and generally designated 10. The RFID system 10 comprises a first RFID transponder 12a, a second RFID transponder 12b, and an RFID reader 14. The RFID reader 14 is a preferred embodiment of an RFID reader of the present invention and is described in greater detail hereafter.

The first and second RFID transponders 12a, 12b are passive devices, which are not physically coupled with an electrical power supply. The electrical power required to operate the first and second RFID transponders 12a, 12b is indirectly supplied to the first and second RFID transponders 12a, 12b by electromagnetic waves, which are periodically propagated through open space 16 to the first and second RFID transponders 12a, 12b from the RFID reader 14. Communication between the first and second RFID transponders 12a, 12b and the RFID reader 14 is only possible when the first and second RFID transponders 12a, 12b and RFID reader 14 are within a certain range of one another, which is dependent on the characteristics of both the RFID reader 14 and the first and second RFID transponders 12a, 12b.

The basic conceptual design of the first and second RFID transponders 12a, 12b is conventional and is essentially the same for each of the RFID transponders 12a and 12b. The design is only described below with reference to the first RFID transponder 12a, but it is understood that the same description applies generally to the second RFID transponder 12b as well. Common transponder elements found in both RFID transponders 12a, 12b are designated in the drawings by the same root reference number (e.g., 12). However, particular transponder elements in the first RFID transponder 12a are distinguished from their counterparts in the second RFID transponder 12b by attaching the suffix "a" to the end of the root reference number if the particular transponder element is found in the first RFID transponder 12a and attaching the suffix "b" to the end of the root reference number if the corresponding particular transponder element is found in the second RFID transponder 12b.

The first RFID transponder 12a includes an integrated circuit (IC) 18a (also termed a transponder chip) and an antenna 20a coupled with the transponder IC 18a. The antenna 20a performs both the receiving and transmitting functions of the first RFID transponder 12a and as such is termed a dual-function antenna. Although not shown, the first RFID transponder 12a can alternatively include two separate antennas, i.e., a receiving antenna and a transmitting antenna, rather than the single dual-function antenna 20a. The two antennas separately perform the receiving and transmitting functions of the first RFID transponder 12a.

In addition to the transponder IC 18a and antenna 20a, the first RFID transponder 12a preferably includes an external tuning capacitor 22a coupled with the transponder IC 18a and antenna 20a. The term "external" is used herein to designate electronic components which are not physically or functionally included within an integrated circuit such as the transponder IC 18a. The tuning capacitor 22a, in cooperation with the antenna 20a, determines the carrier frequency of the first RFID transponder 12a. In particular, the practitioner sets the carrier frequency of the first RFID transponder 12a by selecting an antenna and tuning capacitor for the first RFID transponder 12a, which are tuned to a predetermined carrier frequency. The transponder IC 18a is a custom IC or off-the-shelf IC which performs essentially all remaining functions of the first RFID transponder 12a not encompassed by the antenna 20a and tuning capacitor 22a, including transponder control functions, data storage functions, and any data processing functions required of the first RFID transponder 12a, such as disclosed in the '188 and '574 Patents. All of the above-recited transponder elements 18a, 20a, 22a are embedded in a card 23a.

Although not shown in FIG. 1, an RFID transponder, wherein the tuning capacitor is omitted has alternate utility to the present invention. The carrier frequency of an RFID transponder lacking a tuning capacitor is solely a function of the transponder IC and the selected antenna.

For purposes of illustrating the operation and advantages of the RFID reader 14 of the present invention, the first RFID transponder 12a is constructed to operate at a first carrier frequency and the second RFID transponder 12b is constructed to operate at a second carrier frequency different from the first carrier frequency. The first and second carrier frequencies are typically either one of the two standardized carrier frequencies 125 kHz or 13.56 MHz. Thus, for purposes of illustration the first RFID transponder 12a is termed a proximity card, wherein the antenna 20a and tuning capacitor 22a are tuned to a carrier frequency of 125 kHz. The second RFID transponder 12b is termed a smart card, wherein the antenna 20b and tuning capacitor 22b are tuned to a carrier frequency of 13.56 MHz. In many cases, the transponder IC 18b of the smart card (i.e., the second RFID transponder 12b) has significantly expanded functional capabilities relative to the transponder IC 18a of the proximity card (i.e., the first RFID transponder 12a).

It is understood that the conceptual circuit design of the RFID transponders 12a, 12b recited above and shown in FIG. 1 is exemplary and is not intended to limit the utility of the present invention. In particular, it is understood that the utility of the present invention is not limited to RFID transponders embedded in cards and/or to RFID transponders operating at any specific standard or non-standard carrier frequencies. Furthermore, it is understood that the utility of the present invention is not limited to any one specific transponder circuit design, but is generally applicable to most conventional circuit designs for RFID transponders including the different circuit designs shown and described in the '188, '574, and '263 Patents. Nor is the utility of the present invention limited to passive RFID transponders. It is alternately within the scope of the present invention to replace one or more of the passive RFID transponders 12a, 12b with one or more active RFID transponders not shown operating at the corresponding carrier frequencies. The active RFID transponders are essentially identical to the passive RFID transponders 12a, 12b, but additionally contain an internal electrical power source, such as a battery, which internally provides the electrical power required to operate the active RFID transponder.

It is still further understood that the utility of the present invention is not limited to the present RFID system 10 comprising two RFID transponders 12a, 12b and one RFID reader 14. In practice, the present invention has utility to RFID systems populated by any number of RFID transponders and/or RFID readers.

The basic conceptual design of the RFID reader 14 comprises a signal generator 24 (alternately termed an exciter), receiver electronics 26, a reader microcontroller 28 (preferably including a reader memory), a reader input/output (I/O) interface 30, and a reader power supply 32. The reader 14 further comprises an array of reader antennas, namely, a reader low frequency antenna 34 (and optional correspondingly paired reader low frequency tuning capacitor 36) and a reader high frequency antenna 38 (and optional correspondingly paired reader high frequency tuning capacitor 40).

The reader power supply 32 derives from a finite electrical power source which is self-contained (i.e., internal) within the RFID reader 14, such as a relatively small portable battery consisting of one or more disposable dry cells or rechargeable cells. Alternatively, the reader power supply 32 is hard wired to an essentially infinite remote electrical power source, such as an electric utility.

The signal generator 24 includes conventional electronic components similar to those disclosed in the '188 Patent and U.S. Pat. No. 6,476,708 to Johnson incorporated herein by reference for generating relatively low energy electromagnetic waves termed "ring signals" or "detection signals" and for generating relatively high energy electromagnetic waves termed "excitation signals". In particular, the signal generator 24 includes electronic components for generating low frequency detection and excitation signals having a frequency of 125 kHz and high frequency detection and excitation signals having a frequency of 13.56 MHz.

The signal generator 24 is coupled with the reader low frequency antenna and paired low frequency tuning capacitor 34, 36 via a low frequency antenna input lead 42 to transmit low frequency detection and excitation signals from the signal generator 24 through the open space 16 for reception by the first RFID transponder 12a, which is tuned to 125 kHz. The signal generator 24 is similarly coupled with the reader high frequency antenna and paired high frequency tuning capacitor 38, 40 via a high frequency antenna input lead 44 to transmit high frequency detection and excitation signals from the signal generator 24 through the open space 16 for reception by the second RFID transponder 12b which is tuned to 13.56 MHz.

The antenna input leads 42, 44 are shown to directly connect the reader antennas 34, 38 and associated tuning capacitors 36, 40, respectively, to the signal generator 24. However, it is understood that coupling the reader antennas 34, 38 and associated tuning capacitors 36, 40 with the signal generator 24 via the antenna input leads 42, 44 further encompasses indirect connections, wherein one or more additional intervening electronic components within the purview of the skilled artisan are positioned in the paths of the antenna input leads 42, 44, which extend between the signal generator 24 and the reader antennas 34, 38 and associated tuning capacitors 36, 40.

The excitation signals transmitted from the RFID reader 14 typically have a limited range due to size and power constraints of the RFID reader 14. Thus, the RFID reader 14 and the RFID transponder 12a or 12b are simultaneously operational only when the RFID transponder 12a or 12b is within the range of the RFID reader 14 and, more particularly, when the RFID reader 14 and the RFID transponder 12a or 12b are positioned in relative proximity to one another such that the RFID transponder 12a or 12b receives excitation signals of sufficient strength and an appropriate frequency from the RFID reader 14 to power up the RFID transponder 12a or 12b.

In most conventional RFID systems, the position of the RFID reader is stationary (i.e., constant) relative to the surrounding environment, while the position of the RFID transponder is portable (i.e., variable) within the surrounding environment. In such cases, the user of the RFID system moves the portable RFID transponder into relative proximity with the stationary RFID reader to enable simultaneous operation of the both the RFID transponder and RFID reader. In some conventional RFID systems, however, the position of the RFID reader may be portable relative to the surrounding environment, while the position of the RFID transponder is either portable or stationary. In the case of a portable RFID reader and a stationary RFID transponder, the user moves the portable RFID reader into relative proximity with the stationary RFID transponder to enable simultaneous operation of the both the RFID transponder and RFID reader. In the case of a portable RFID reader and a portable RFID transponder, the user may move both the portable RFID reader and the portable RFID transponder into relative proximity with one another to enable simultaneous operation of the both the RFID transponder and RFID reader. The utility of the present invention is not limited to the portability or conversely the lack of portability of either the RFID reader 14 or the RFID transponders 12a, 12b.

The signal generator 24 initially operates in a transponder detection mode. The transponder detection mode is a reduced power state of operation which is effected by periodically drawing reduced electrical current from the reader power supply 32 under the direction of the reader microcontroller 28. A reader microcontroller is generally defined herein to include substantially any processor sized to fit within a conventional RFID reader and having sufficient capabilities to perform the desired processing functions of the RFID reader.

The signal generator 24 periodically generates both 125 kHz and 13.56 MHz detection signals containing analog data in response to the reduced electrical current. The 125 kHz detection signals are periodically transmitted from the RFID reader 14 on the reader low frequency antenna 34 and the 13.56 MHz detection signals are periodically transmitted from the RFID reader 14 on the reader high frequency antenna 38. The detection signals are of insufficient strength to power operation of either RFID transponder 12a, 12b residing in the surrounding open space 16, but nevertheless propagate into the open space 16 surrounding the RFID reader 14. Propagated detection signals returned to the RFID reader 14 via the reader low and/or high frequency antennas 34, 38 are monitored and evaluated by the RFID reader 14 when operating in the transponder detection mode.

In accordance with the present embodiment, the monitoring and evaluating functionalities are integrated into the reader microcontroller 28, which is preferably a single-chip device. The reader microcontroller 28 has a first microcontroller input lead 46 and a second microcontroller input lead 48. The first microcontroller input lead 46 couples the reader microcontroller 28 with the reader power supply 32. The second microcontroller input lead 48 couples the reader microcontroller 28 with the receiver electronics 26. The receiver electronics 26 are in turn coupled with the reader low frequency antenna and paired low frequency tuning capacitor 34, 36 via a low frequency antenna output lead 50 and with the reader high frequency antenna and paired high frequency tuning capacitor 38, 40 via a high frequency antenna output lead 52.

The antenna output leads 50, 52 are shown to directly connect the reader antennas 34, 38 and associated tuning capacitors 36, 40, respectively, to the receiver electronics 26. However, it is understood that coupling the reader antennas 34, 38 and associated tuning capacitors 36, 40 with the receiver electronics 26 via the antenna output leads 50, 52 further encompasses indirect connections, wherein one or more additional intervening electronic components within the purview of the skilled artisan are positioned in the paths of the antenna output leads 50, 52, which extend between the receiver electronics 26 and the reader antennas 34, 38 and associated tuning capacitors 36, 40.

The analog data of the detection signals are converted to digital data and the reader microcontroller 28 identifies changes in degree and/or changes in kind within the digital data. The reader microcontroller 28 recognizes which changes in the digital data correspond to changes in one or more selected detection parameters, such as the decay rate or voltage of the detection signals. Changes in one or more of the selected detection parameters indicates the presence of an RFID transponder 12a or 12b having a given frequency in the open space 16.

When the reader microcontroller 28 detects an RFID transponder 12a or 12b, the reader microcontroller 28 switches the signal generator 24 from the transponder detection mode at the reduced power state to a transponder excitation mode at an increased power state of operation. Switching the signal generator 24 to the excitation mode terminates periodic generation of the detection signals of the given frequency and causes the signal generator 24 to draw increased electrical current from the reader power supply 32. The increased draw of electrical current in the excitation mode enables the signal generator 24 to generate an excitation signal of the given frequency under the direction of the reader microcontroller 28. The excitation signal is in the form of an electromagnetic wave, which has sufficient strength to power up the RFID transponder 12a or 12b.

The transponder antenna 20a or 20b has an excitation signal reception range which is generally several inches when the reader and transponder antennas are coaxially aligned. When the RFID transponder 12a or 12b and/or RFID reader 14 is moved to a proximal position such that the distance between RFID reader 14 and the RFID transponder 12a or 12b is within the excitation signal reception range of the transponder antenna 20a or 20b, the transponder antenna 20a or 20b receives the excitation signal at a sufficient strength to power up the transponder IC 18a or 18b, thereby activating the RFID transponder 12a or 12b.

Upon activation, the transponder IC 18a or 18b generates a communication signal termed a transponder data signal, which contains readable information (i.e., digital data) copied or otherwise derived from the memory of the transponder IC 18a or 18b. The transponder data signal is in the form of an electromagnetic wave like the excitation signal. It is noted that communication signals of RFID systems (i.e., excitation and transponder data signals) are typically termed radio frequency signals. However, the excitation and transponder data signals of the present invention are not limited exclusively to signals having specific frequencies within the narrow "radio frequency" range, as "radio frequency" is commonly defined for the radio communication industry. The RFID transponder 12a or 12b transmits the transponder data signal into the open space 16 of the external environment via the transponder antenna 20a or 20b.

Each of the reader antennas 34, 38 acts as a single dual-function antenna, which performs both the receiving and transmitting functions of the RFID reader 14. In particular, the reader antennas 34, 38 receive the low and high frequency detection signals and the low and high frequency transponder data signals, respectively, from the open space 16 and transmit the low and high frequency detection and excitation signals into the open space 16. However, the present invention is not limited to an RFID reader with dual-function antennas. The present invention alternately encompasses an RFID reader with separate receiving and transmitting antennas, which separately perform the transponder data signal and detection signal receiving functions of the RFID reader and the detection signal and excitation signal transmitting functions of the RFID reader, respectively. In yet another alternative, where an RFID reader is provided with separate receiving and transmitting antennas, the reader transmitting antennas are capable of being adapted to act as dual-function antennas (i.e., receiving and transmitting) only with respect to the detection signals while the reader transmitting and receiving antennas function separately with respect to the transponder data signals.

Transponder data signal reading components and their corresponding functionality are integrated into the reader microcontroller 28 along with the transponder detection components and the components for activating the excitation mode and their corresponding functionalities described above. The receiver electronics 26 receive the low and high frequency transponder data signals for any of a plurality of data rates and modulation types, from the reader antennas 34, 38, via the low and high frequency antenna output leads 50, 52, respectively. The receiver electronics 26 "condition" the low and high frequency transponder data signals, thereby placing the signals containing analog and digital data of differing carrier frequencies, data rates and modulation types as recited above into a form which enables the reader microcontroller 28 to properly process the entire range of signals. After conditioning the transponder data signals, the receiver electronics 26 conveys the resulting conditioned transponder data signals to the reader microcontroller 28 via the second microcontroller input 48.

The reader microcontroller 28 demodulates the conditioned transponder data signals in accordance with the respective modulation type of the signal to read the data on the signals. The resulting data can then be sent to an external device (not shown), such as a central host computer, via the reader I/O interface 30.

It is understood that the conceptual circuit design of the RFID reader 14 recited above and shown in FIG. 1 is but one exemplary embodiment of the present invention and that alternate embodiments exist within the scope of the present invention. For example, it is within the purview of the skilled artisan to replace the reader microcontroller 28 in whole or in part with one or more alternate electronic components which perform some or all of the functions performed by the reader microcontroller 28 in the above-recited embodiment. It is additionally noted that FIG. 1 is merely a schematic block diagram of the RFID reader 14, wherein the individual elements are depicted conceptually. For example, the signal generator 24 is depicted as a single integrated construct coupled with both reader antennas 34, 38. However, it is within the scope of the present invention to provide separate discrete signal generators dedicated to each reader antenna 34 and 38. The receiver electronics 26 are similarly depicted as a single integrated construct coupled with both reader antennas 34, 38. However, it is within the scope of the present invention to provide separate discrete receiver electronics dedicated to each reader antenna 34 and 38.

The term "reader low frequency antenna assembly" is used herein to designate in combination the reader low frequency antenna 34, the low frequency antenna input lead 42, and the low frequency antenna output lead 50. The term "reader high frequency antenna assembly" is similarly used herein to designate in combination the reader high frequency antenna 38, the high frequency antenna input lead 44, and the high frequency antenna output lead 52. The reader antenna 34 or 38 is the portion of the antenna assembly which is configured primarily for the function of receiving transponder data signals and/or transmitting detection and excitation signals. The antenna input lead 42 or 44 is the portion of the antenna assembly which is configured primarily for the function of coupling the signal generator 24 with the reader antenna 34 or 38 to convey detection and excitation signals from the signal generator 24 to the reader antenna 34 or 38. The antenna output lead 50 or 52 is the portion of the antenna assembly which is configured primarily for the function of coupling the receiver electronics 26 with the reader antenna 34 or 38 to convey transponder data signals from the reader antenna 34 or 38 to the receiver electronics 26.

The reader antenna assemblies are conceptually depicted in FIG. 1 as coils, each of which includes a reader antenna 34 or 38 configured as a single spiral winding. However, it is within the scope of the present invention to configure the reader antennas 34, 38 in substantially any utilitarian configuration known to the skilled artisan. For example, the reader antennas 34, 38 can have a single winding as shown or can alternatively have multiple windings. The reader antennas 34, 38 can also have substantially any utilitarian shape in addition to a spiral as shown, such as a square, circle or oval. The reader antennas 34, 38 are conceptually depicted in FIG. 1 as being arranged in parallel adjacent to one another. However, alternate more specific arrangements of the reader antennas 34, 38 with respect to one another can be advantageously selected in accordance with the teaching of the present invention as recited below.

Various alternate arrangements of the reader antennas 34, 38, which are within the scope of the present invention, are described by way of example below with reference to FIGS. 2-6. For simplicity of illustration, but in no way limiting the present invention, each reader antenna 34, 38 is configured in the shape of a square and has a single winding. Furthermore, the reader low frequency antenna 34 is depicted by a solid antenna outline, while the reader high frequency antenna 38 is depicted by a dashed antenna outline in FIGS. 2-6. However, the solid antenna outline can alternatively depict the reader high frequency antenna 38, while the dashed antenna outline can alternatively depict the reader low frequency antenna 34.

In general, the reader antennas 34, 38 are preferably operationally positioned by fixably mounting the reader antennas 34, 38 within a housing 54 (shown in FIG. 1) for the RFID reader 14. The reader housing 54 is an external casing or shell constructed from a material, such as a rigid plastic, which contains and protects the elements of the RFID reader 14, including the reader antennas 34, 38, without substantially impairing operation of the RFID reader 14. It is frequently a desirable that the reader housing 54 be as compact as practically possible. Since the size of the reader housing 54 is at least in part a function of the arrangement of the reader antennas 34, 38, it is desirable to arrange the reader antennas 34, 38 in a manner which enables the reader antennas 34, 38 to be contained within a reader housing 54 having an acceptable compact size.

Closely positioning the reader antennas 34, 38 within the reader housing 54 clearly reduces the size requirements of the reader housing 54. However, it has been found that closely positioning the reader antennas 34, 38 without regard to their specific arrangement can cause interference between the reader antennas 34, 38 which can correspondingly diminish the communication range of either reader antenna 34, 38. An RFID reader typically relies on a resonance effect at a desired operating frequency to maximize the strength of the magnetic field embodying the detection and excitation signals, which emanates into open space from the RFID reader. The resonance effect is inter alia a function of the inductance of the antenna coil and the capacitance of the tuning capacitor within the resonant circuit of the RFID reader. When two antenna coils are closely positioned with respect to one another within an array of multiple antenna coils, small capacitances termed "parasitic" or "stray" capacitances are also created between the antenna coils. The parasitic or stray capacitances of a given antenna coil in combination with the inductance of that antenna coil creates a "self resonance" effect, which, if unaccounted for in the antenna coil design, significantly reduces the strength of the magnetic field emanating from either antenna coil, thereby significantly reducing the communication range of either antenna coil.

The self resonance effect is illustrated by the case where two antenna coils are positioned in close proximity to one another. When the first antenna coil in combination with a first tuning capacitor is driven by a signal generator, a magnetic field is emitted from the first antenna coil. If at least a portion of this magnetic field passes through the proximal second antenna coil, the magnetic field causes electrical activity within the second antenna coil resulting from the self resonance of the second antenna coil. In the worst case, the second antenna coil is at the same resonant frequency as the first antenna coil in combination with the first tuning capacitor, which causes the maximum amount of energy from the signal generator to be lost into the second antenna coil and substantially reduces the communication range of the first antenna coil.

To illustrate a more specific case of self resonance, the first and second antennas are closely positioned and the first antenna coil is a low frequency (125 kHz) reader antenna while the second antenna coil is a high frequency (13.56 MHz) reader antenna. The reader low frequency antenna has an exemplary inductance of 1 millihenry. Since the square of resonant frequency (in radians) is inversely proportional to the product of the inductance and the capacitance, the capacitance of the reader low frequency antenna for 13.56 MHz self resonance is about 0.14 picofarads, which is in the range of parasitic or stray capacitance. It is extremely difficult to control capacitances at this level and correspondingly to prevent the self resonance of the reader low frequency antenna at or near 13.56 MHz from interfering with operation of the reader high frequency antenna.

Figure 2A:
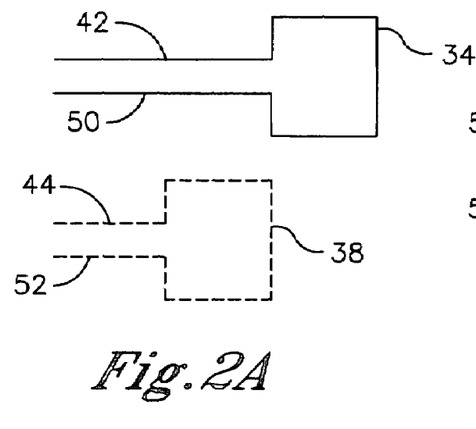
FIGS. 2A and 2B are a conceptualized top view and side view, respectively, of a first antenna arrangement for an antenna array of the present invention having utility in the RFID reader of FIG. 1.
Figure 2B:
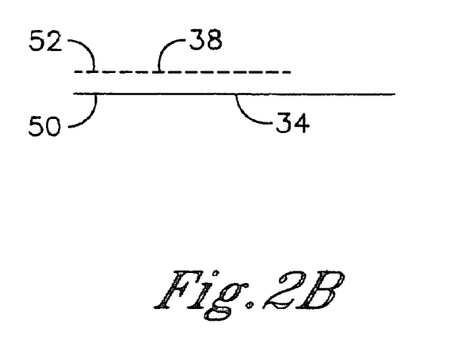

Referring initially to FIGS. 2A and 2B, the reader antennas 34, 38 are shown in an isolation arrangement. The reader antennas 34, 38 have a fixed non-contacting parallel orientation and each reader antenna 34 or 38 has essentially the same area. The reader antennas 34, 38 are sufficiently spaced apart from one another in the both vertical and horizontal directions to spatially isolate the reader antennas 34, 38 from one another and to avoid significant magnetic flux generated by the other. As such, the self resonance effect has little detrimental impact on the communication range of either the reader low frequency antenna 34 or the reader high frequency antenna 38, and correspondingly has little detrimental impact on the performance of the RFID reader. Nevertheless, the spatial requirements of the isolation arrangement undesirably necessitate a relatively large reader housing. In addition, the user is undesirably required to manually position the RFID transponder nearest the reader antenna 34 or 38 which is compatible with that particular RFID transponder to optimize communication between the RFID reader and the RFID transponder.

A preferred antenna arrangement to the isolation arrangement is termed an overlapping arrangement. In accordance with the overlapping arrangement, the two reader antennas 34, 38 are fixably mounted in such a way that one of the reader antennas 34 or 38 could be brought into contact with the other reader antenna 38 or 34 at some point of rotation if the reader antenna 34 or 38 were to be rotated from its fixed position about its center of mass. The overlapping arrangement further encompasses the case, wherein the reader antennas 34 and 38 could be brought into contact with one another at some point of rotation if both fixably mounted reader antennas 34 and 38 were to be rotated from their respective fixed positions about their respective centers of mass. It is noted that the overlapping arrangement does not require the input and/or output leads 42, 50 or 44, 52 of the rotated antenna assembly to come into contact with the other reader antenna 38 or 34 or with the input and/or output leads 44, 52 or 42, 50 of the other antenna assembly.

An alternate preferred antenna arrangement is termed an opposing magnetic flux arrangement. In accordance with the opposing magnetic flux arrangement, the two reader antennas 34, 38 are fixably mounted in non-contacting or contacting relation to one another, such that significant magnetic flux generated by one reader antenna 34 or 38 passes through the other reader antenna 38 or 34 in an opposing manner (i.e., both positive and negative magnetic flux from one reader antenna 34 or 38 passes through the other reader antenna 38 or 34). Positive magnetic flux is defined herein as magnetic flux which induces a positive voltage across an antenna coil. Negative magnetic flux is conversely defined herein as magnetic flux which induces a negative voltage across an antenna coil. It is noted that the opposing magnetic flux arrangement does not require the positive and negative magnetic fluxes to be of equal magnitude. It is further noted that an antenna arrangement can simultaneously satisfy the definition of both the overlapping arrangement and opposing magnetic flux arrangement.

Figure 3A:
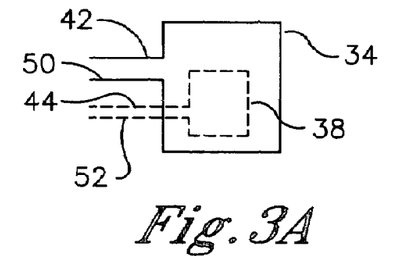
FIGS. 3A and 3B are a conceptualized top view and side view, respectively, of a second antenna arrangement for an antenna array of the present invention having utility in the RFID reader of FIG. 1.
Figure 3B:
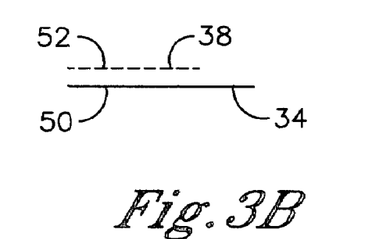

Referring to FIGS. 3A and 3B, the reader antennas 34, 38 are shown in the opposing magnetic flux arrangement. The reader antennas 34, 38 have a fixed non-contacting parallel orientation and the reader low frequency antenna 34 has a larger area than the reader high frequency antenna 38. The reader antennas 34, 38 are arranged relative to one another such that the area of the reader high frequency antenna 38 fits entirely within the area of the reader low frequency antenna 34. The magnetic flux generated by the reader high frequency antenna 38 in the negative direction (i.e., the magnetic flux emanating from the exterior of the reader high frequency antenna 38) passes through the reader low frequency antenna 34 and the magnetic flux generated by the reader high frequency antenna 38 in the positive direction (i.e., the magnetic flux emanating from the interior of the reader high frequency antenna 38) also passes through the reader low frequency antenna 34. As a result, the positive and negative magnetic fluxes generated by the reader high frequency antenna 38, which pass through the reader low frequency antenna 34, cancel out, summing to essentially zero. Thus, there is essentially no self resonance effect on the reader low frequency antenna 34 due to the magnetic flux of the reader high frequency antenna 38.

It is noted in the case of FIGS. 3A and 3B that the converse is not true. Only the magnetic flux generated by the reader low frequency antenna 34 in the positive direction (i.e., the magnetic flux emanating from the interior of the reader low frequency antenna 34) passes through the reader high frequency antenna 38. As a result, the positive and negative magnetic fluxes generated by the reader low frequency antenna 34, which pass through the reader high frequency antenna 38, do not cancel out by summing to zero. Thus, there is a self resonance effect on the reader high frequency antenna 38 due to the magnetic flux of the reader low frequency antenna 34.

Figure 4A:
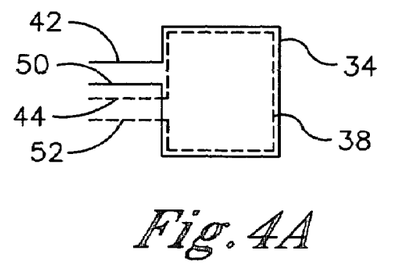
FIGS. 4A and 4B are a conceptualized top view and side view, respectively, of a third antenna arrangement for an antenna array of the present invention having utility in the RFID reader of FIG. 1.
Figure 4B:
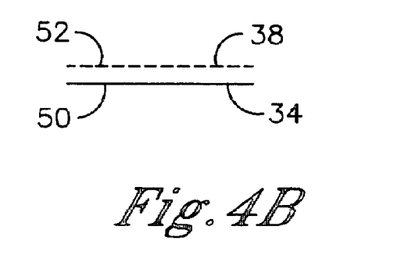

Referring to FIGS. 4A and 4B, the reader antennas 34, 38 are shown in the overlapping arrangement. The reader antennas 34, 38 have a fixed non-contacting parallel orientation and each has essentially the same area. The reader antennas 34, 38 are arranged relative to one another such that the area of the reader low frequency antenna 34 aligns essentially identically with the area of the reader high frequency antenna 38. As a result, the reader low frequency antenna 34 could come into contact with the reader high frequency antenna 38 if the reader low frequency antenna 34 were to be rotated about its center of mass. Likewise, the reader high frequency antenna 38 could come into contact with the reader low frequency antenna 34 if the reader high frequency antenna 38 were to be rotated about its center of mass.

Only the magnetic flux generated by the reader low frequency antenna 34 in the positive direction passes through the reader high frequency antenna 38 and similarly only the magnetic flux generated by the reader high frequency antenna 38 in the positive direction passes through the reader low frequency antenna 34. As a result, neither the magnetic fluxes generated by the reader low frequency antenna 34, which pass through the reader high frequency antenna 38, nor the magnetic fluxes generated by the reader high frequency antenna 38, which pass through the reader low frequency antenna 34, cancel out. Thus, there is a self resonance effect on the reader low frequency antenna 34 due to the magnetic flux of the reader high frequency antenna 38 as well as a self resonance effect on the reader high frequency antenna 38 due to the magnetic flux of the reader low frequency antenna 34.

The antenna arrangements shown in FIGS. 3A and 3B and FIGS. 4A and 4B, respectively, both enable close positioning of the reader antennas 34, 38 and correspondingly enable a compact reader housing. However, as noted, neither arrangement is optimal because neither completely avoids energy loss in the reader antennas due to self resonance.

Figure 5A:
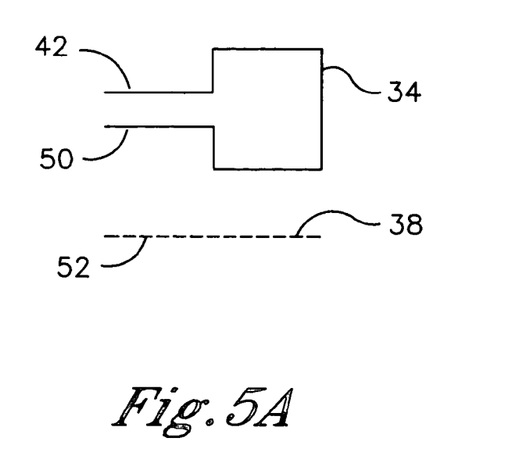
FIGS. 5A and 5B are a conceptualized top view and side view, respectively, of a fourth antenna arrangement for an antenna array of the present invention having utility in the RFID reader of FIG. 1.
Figure 5B:
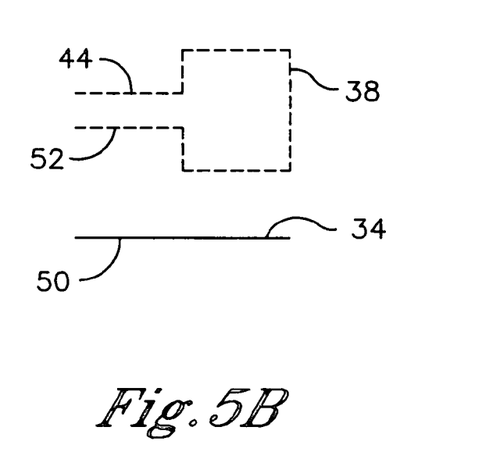

Referring to FIGS. 5A and 5B, the reader antennas 34, 38 are shown again in the overlapping arrangement. The reader antennas 34, 38 have a fixed non-contacting perpendicular orientation and each has essentially the same area. The reader antennas 34, 38 are mounted side-by-side, but at right angles to one another. This arrangement results in essentially no significant self resonance effect on the reader high frequency antenna 38 due to the magnetic flux of the reader low frequency antenna 34 and similarly essentially no significant self resonance effect on the reader low frequency antenna 34 due to the magnetic flux of the reader high frequency antenna 38. As such, the self resonance effect has little detrimental impact on the communication range of either the reader low frequency antenna 34 or the reader high frequency antenna 38, and correspondingly has little detrimental impact on the performance of the RFID reader. Nevertheless, as in the arrangement of FIGS. 2A and 2B, the spatial requirements of the present arrangement undesirably necessitate a relatively large reader housing. In addition, the user is undesirably required to manually position the RFID transponder nearest the reader antenna 34 or 38 which is compatible with that particular RFID transponder to optimize communication between the RFID reader and the RFID transponder.

Figure 6A:
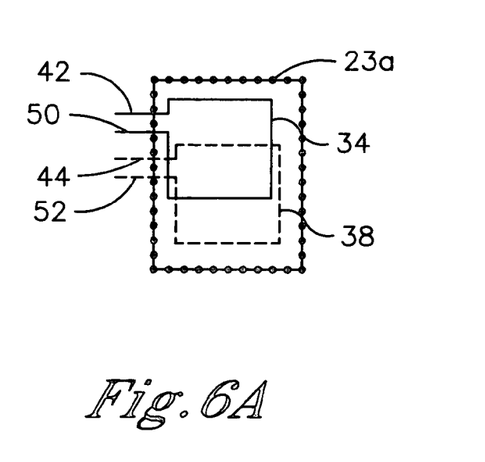
FIGS. 6A and 6B are a conceptualized top view and side view, respectively, of a fifth antenna arrangement for an antenna array of the present invention having utility in the RFID reader of FIG. 1.
Figure 6B:
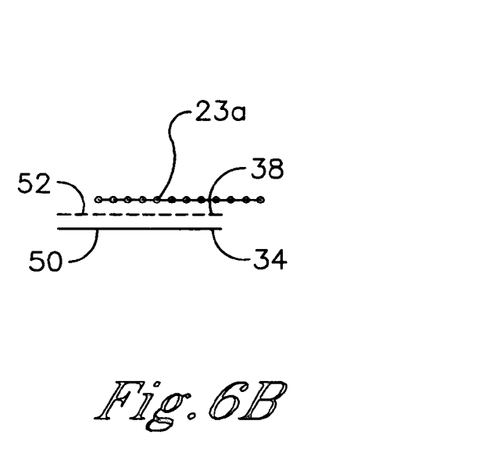

Referring to FIGS. 6A and 6B, the reader antennas 34, 38 are shown in the simultaneous overlapping and opposing magnetic flux arrangements. The reader antennas 34, 38 have a fixed non-contacting parallel orientation and each has essentially the same total area. The reader antennas 34, 38 are arranged relative to one another such that essentially half the total area of the reader low frequency antenna 34 aligns with essentially half the total area of the reader high frequency antenna 38. As a result, the reader low frequency antenna 34 could come into contact with the reader high frequency antenna 38 if the reader low frequency antenna 34 were to be rotated about its center of mass. Likewise, the reader high frequency antenna 38 could come into contact with the reader low frequency antenna 34 if the reader high frequency antenna 38 were to be rotated about its center of mass.

The same magnitude of magnetic flux generated by the reader low frequency antenna 34 in the positive and negative directions passes through the reader high frequency antenna 38 and similarly the same magnitude of magnetic flux generated by the reader high frequency antenna 38 in the positive and negative directions passes through the reader low frequency antenna 34. As a result, the magnetic fluxes generated by the reader low frequency antenna 34, which pass through the reader high frequency antenna 38, and the magnetic fluxes generated by the reader high frequency antenna 38, which pass through the reader low frequency antenna 34, cancel out essentially in their entirety. Thus, there is essentially no self resonance effect on the reader low frequency antenna 34 due to the magnetic flux of the reader high frequency antenna 38, nor is there essentially any self resonance effect on the reader high frequency antenna 38 due to the magnetic flux of the reader low frequency antenna 34. As such, the self resonance effect has little detrimental impact on the communication range of either the reader low frequency antenna 34 or the reader high frequency antenna 38, and correspondingly has little detrimental impact on the performance of the RFID reader.

The spatial requirements of the present arrangement of FIGS. 6A and 6B are relatively small, thereby enabling a relatively compact reader housing. In addition, the areas of the reader antennas 34, 38 are selected such that the area of the overlapping reader antennas 34, 38 in combination is comparable to the area of the card 23a (or alternatively the card 23b not shown) in which the RFID transponder is embedded. Accordingly, the area of the reader housing containing the reader antennas 34, 38 is likewise comparable to the area of the card 23a. Therefore, the user need only perform the relatively simple task of manually positioning the card 23a over the reader housing to align the RFID transponder with both reader antennas 34, 38 simultaneously and optimize communication between the RFID reader and the RFID transponder.

The simultaneous overlapping and opposing magnetic flux arrangement of the reader antennas 34, 38 shown in FIGS. 6A and 6B is a specific case of a more generalized characterization of the simultaneous overlapping and opposing magnetic flux arrangement of the reader antennas 34, 38 within the scope of the present invention, wherein the reader low frequency antenna 34 has an overlap area which is substantially less than the total area of the reader low frequency antenna 34 and the reader high frequency antenna 38 has an overlap area which is substantially less than the total area of the reader high frequency antenna 38. In other words, the reader low frequency antenna 34 and the reader high frequency antenna 38 are arranged relative one another such that only a portion of total area of the reader low frequency antenna 34 aligns with only a portion of the total area of the reader high frequency antenna 38.

The above-recited generalized characterization of the simultaneous overlapping and opposing magnetic flux arrangement of the reader antennas 34, 38 encompasses additional alternate specific antenna arrangements, which are within the scope of the present invention, but which are not shown in the drawings. For example, the above-recited generalized characterization encompasses an alternate specific antenna arrangement, wherein each reader antenna 34, 38 has an overlap area which is substantially less than its respective total area and the total area of each reader antenna 34, 38 is substantially different from the other. The above-recited generalized characterization further encompasses an alternate specific antenna arrangement, wherein each reader antenna 34, 38 has an overlap area which is substantially less than its respective total area and the overlap area of the each reader antenna 34, 38 is substantially different from the other.

The alternate specific antenna arrangements described above may not be as effective as the specific antenna arrangement of FIGS. 6A and 6B in eliminating the self resonance effect on the reader low frequency antenna 34 due to the magnetic flux of the reader high frequency antenna 38 and/or eliminating the self resonance effect on the reader high frequency antenna 38 due to the magnetic flux of the reader low frequency antenna 34. Nevertheless, the alternate specific antenna arrangements can provide a broadly compatible RFID reader having an acceptable degree of compactness and satisfactory performance characteristics.

While the forgoing preferred embodiments of the invention have been described and shown, it is understood that alternatives and modifications, such as those suggested and others, may be made thereto and fall within the scope of the invention.

I claim:

1. An antenna array for an RFID reader comprising:
a first reader antenna tuned to operate at a first low carrier frequency enabling data communication with a first transponder transmitting data signals at said first low carrier frequency; and
a second reader antenna tuned to operate at a second high carrier frequency different from said first low carrier frequency enabling data communication with a second transponder transmitting data signals at said second high carrier frequency, wherein the first and second antennas are oriented along axes that are substantially parallel to one another.

2. The antenna array of claim 1, wherein said first low carrier frequency is nominally 125 kHz.

3. The antenna array of claim 2, wherein said second high carrier frequency is about 13.56 MHz.

4. The antenna array of claim 1, further comprising a reader housing containing said first and second antennas.

5. An antenna array for an RFID reader comprising:
a first reader antenna tuned to operate at a first carrier frequency enabling data communication with a first transponder transmitting data signals at said first carrier frequency; and
a second reader antenna tuned to operate at a second carrier frequency different from said first carrier frequency enabling data communication with a second transponder transmitting data signals at said second carrier frequency, wherein said first and second antennas are arranged in at least a partially overlapping arrangement on proximate adjacent planes.

6. The antenna array of claim 5, further comprising a reader housing containing said first and second antennas.

7. The antenna array of claim 5, wherein said first reader antenna has a first area, said second reader antenna has a second area, and said first and second reader antennas are arranged relative one another such that only a portion of said first area aligns with only a portion of said second area.

8. The antenna array of claim 5, wherein said first reader antenna has a first area, said second reader antenna has a second area essentially equal to said first area, and said first and second reader antennas have a parallel orientation and are arranged relative one another such that essentially half of said first area aligns with essentially half of said second area.

9. An antenna array for an RFID reader comprising:
a first reader antenna tuned to operate at a first carrier frequency enabling data communication with a first transponder transmitting data signals at said first carrier frequency; and
a second reader antenna tuned to operate at a second carrier frequency different from said first carrier frequency enabling data communication with a second transponder transmitting data signals at said second carrier frequency, wherein said first and second antennas are arranged in an opposing magnetic flux arrangement.

10. The antenna array of claim 9, further comprising a reader housing containing said first and second antennas.

11. The antenna array of claim 9, wherein said first reader antenna has a first area, said second reader antenna has a second area, and said first and second reader antennas are arranged relative one another such that only a portion of said first area aligns with only a portion of said second area.

12. The antenna array of claim 9, wherein said first reader antenna has a first area, said second reader antenna has a second area essentially equal to said first area, and said first and second reader antennas have a parallel orientation and are arranged relative one another such that essentially half of said first area aligns with essentially half of said second area.

13. The antenna array of claim 9, wherein said first and second reader antennas are arranged in an overlapping arrangement simultaneous with said opposing magnetic flux arrangement.

14. An RFID reader for an RFID system comprising:
an antenna array including a first reader antenna tuned to operate at a first low carrier frequency enabling data communication with a first transponder transmitting data signals at said first low carrier frequency and a second reader antenna tuned to operate at a second high carrier frequency different from said first low carrier frequency enabling data communication with a second transponder transmitting data signals at said second high carrier frequency, wherein the first and second antennas are oriented along axes that are substantially parallel to one another; and
a signal generator coupled with said first and second reader antennas.

15. The RFID reader of claim 14, wherein said signal generator is an integrated signal generator including integral means for generating signals for transmission from said first and second reader antennas.

16. The RFID reader of claim 14, wherein said signal generator includes a discrete first signal generator coupled with said first reader antenna for generating signals for transmission from said first reader antenna and a discrete second signal generator coupled with said second reader antenna separate from said discrete first signal generator for generating signals for transmission from said second reader antenna.

17. An RFID reader for an RFID system comprising:
an antenna array including a first reader antenna tuned to operate at a first low carrier frequency enabling data communication with a first transponder transmitting data signals at said first low carrier frequency and a second reader antenna tuned to operate at a second high carrier frequency different from said first low carrier frequency enabling data communication with a second transponder transmitting data signals at said second high carrier frequency, wherein the first and second antennas are arranged in at least a partially overlapping arrangement along proximate adjacent planes; and receiver electronics coupled with said first and second reader antennas.

18. The RFID reader of claim 17, wherein said receiver electronics is integrated receiver electronics including integral means for conditioning signals received by said first and second reader antennas.

19. The RFID reader of claim 17, wherein said receiver electronics includes discrete first receiver electronics coupled with said first reader antenna for conditioning signals received by said first reader antenna and discrete second receiver electronics coupled with said second reader antenna separate from said discrete first receiver electronics for conditioning signals received by said second reader antenna.

20. An antenna array for an RFID reader comprising:
- a first reader loop antenna having a first loop and tuned to operate at a first carrier frequency enabling data communication with a first transponder transmitting data signals at said first carrier frequency; and
- a second reader loop antenna having a second loop and tuned to operate at a second carrier frequency different from said first carrier frequency enabling data communication with a second transponder transmitting data signals at said second carrier frequency, wherein a first plane defined by the first area is substantially orthogonal to a direction of magnetic flux created through the first antenna, wherein a second plane defined by the second area is substantially orthogonal to a direction of magnetic flux created through the second antenna, wherein said first and second loops are arranged relative to one another such that a portion of the first area in the first plane overlaps a portion of the second area in the second plane.

21. The antenna array of claim 20, wherein the directions of magnetic flux created through the first and second antennas are not orthogonal.

22. The antenna array of claim 20, wherein said first and second loops have a parallel orientation and are arranged relative one another such that a size of the portion of the first area aligning with the portion of the second area is less than at least one of a size of the first area and a size of the second area.

23. An antenna array for an RFID reader comprising:
- a first reader loop antenna having a first loop and tuned to operate at a first carrier frequency enabling data communication with a first transponder transmitting data signals at said first carrier frequency; and
- a second reader loop antenna having a second loop and tuned to operate at a second carrier frequency different from said first carrier frequency enabling data communication with a second transponder transmitting data signals at said second carrier frequency, wherein said first and second loops are arranged in an opposing magnetic flux arrangement where the direction of magnetic flux created through the first loop is substantially parallel but opposite to the direction of magnetic flux created through the second loop.

24. The antenna array of claim 23, wherein said first loop has a first area, said second loop has a second area, and said first and second loops are arranged relative one another such that only a portion of said first area aligns with only a portion of said second area.

25. The antenna array of claim 23, wherein said first loop has a first area, said second loop has a second area essentially equal to said first area, and said first and second loops have a parallel orientation and are arranged relative one another such that essentially half of said area aligns with essentially half of said second area.

26. The antenna array of claim 23, wherein said first and second loops are arranged in an overlapping arrangement simultaneous with said opposing magnetic flux arrangement.

\* \* \* \* \*